United States Patent [19]

Jacobs

[11] 4,026,142
[45] May 31, 1977

[54] EDDY-CURRENT SYSTEM FOR THE VIBRATION-TESTING OF BLADES

[75] Inventor: Martin E. Jacobs, Chillicothe, Ohio

[73] Assignee: The United States of America as represented by the United States Energy Research and Development Administration, Washington, D.C.

[22] Filed: May 10, 1976

[21] Appl. No.: 685,013

[52] U.S. Cl. .................................. 73/67.4; 73/67.3
[51] Int. Cl.² ......................................... G01M 7/00
[58] Field of Search ............... 73/67.4, 67.3, 71.5 R

[56] References Cited
UNITED STATES PATENTS

| 2,675,698 | 4/1954 | Johnson | 73/67.3 |
| 3,555,887 | 1/1971 | Wood | 73/67.4 |
| 3,600,934 | 8/1971 | Hendrix | 73/67.3 |

Primary Examiner—James J. Gill
Assistant Examiner—Anthony V. Ciarlante
Attorney, Agent, or Firm—Dean E. Carlson; David S. Zachry; Fred O. Lewis

[57] ABSTRACT

This invention is an improved system for the vibration-testing of cantilevered non-ferrous articles by inducing eddy currents therein. The principal advantage of the system is that relatively little heat is generated in the article being vibrated. Thus, a more accurate measurement of the fatigue characteristics of the article is obtained. Furthermore, the generation of relatively little heat in the blade permits tests to be conducted in low-pressure atmospheres simulating certain actual processes environments.

Heat-generation in the vibrated article is minimized by utilizing eddy currents which are generated by an electromagnet whose magnetic field varies but does not change polarity. The typical winding for the electromagnet is excited with pulsating d.c. That is, the winding is alternately charged by connecting it across a d.c. power supply and then discharged by connecting it across a circuit for receiving current generated in the winding by self-induction. Preferably, the discharge circuit is designed so that the waveform of the discharging current approximates that of the charging current.

10 Claims, 9 Drawing Figures

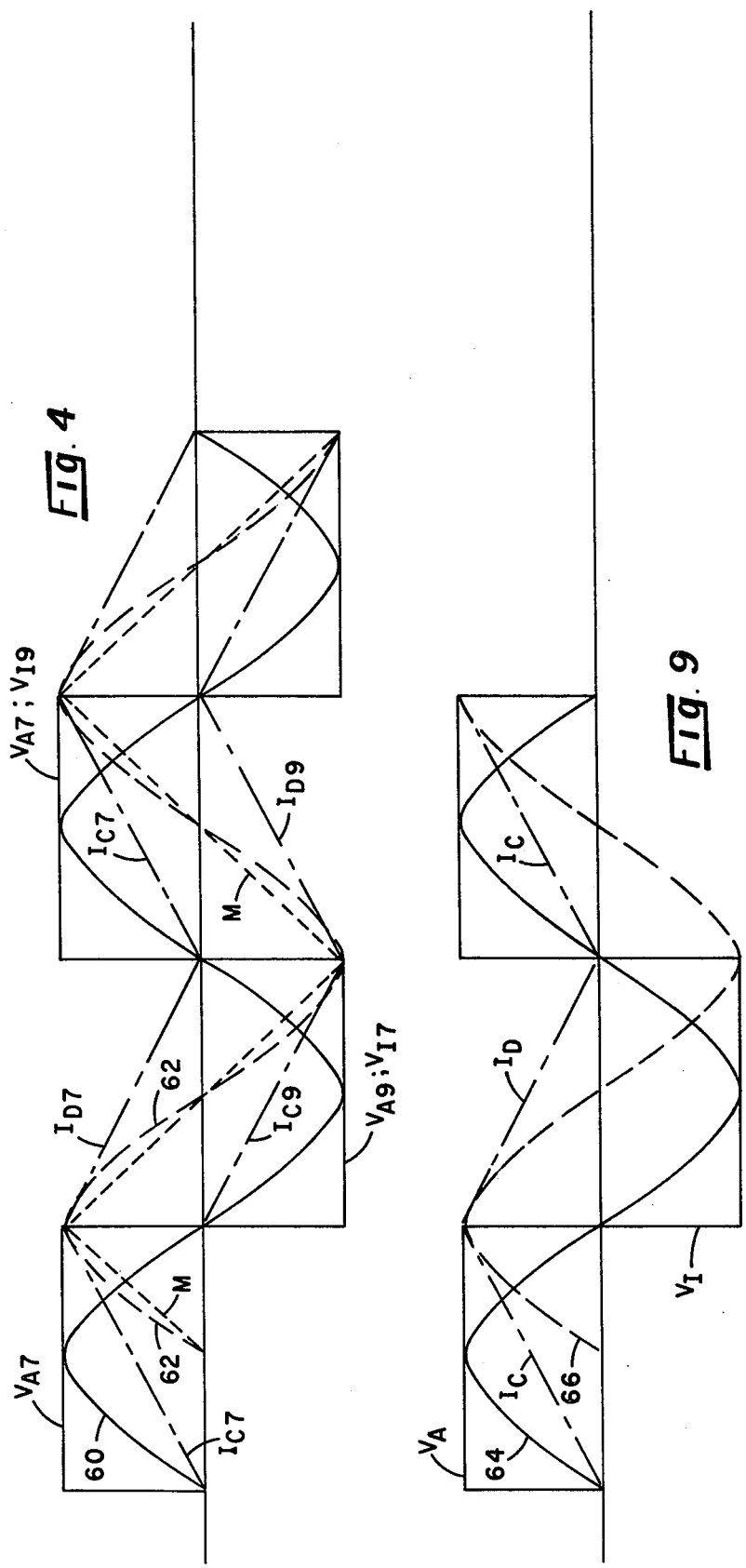

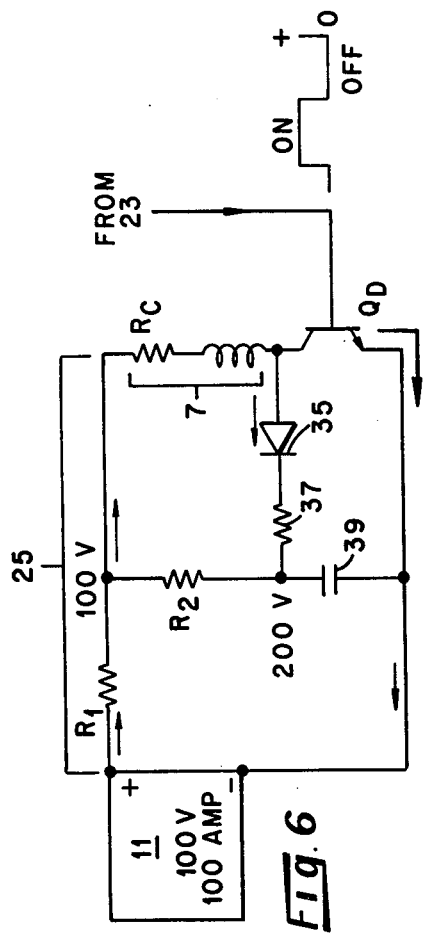
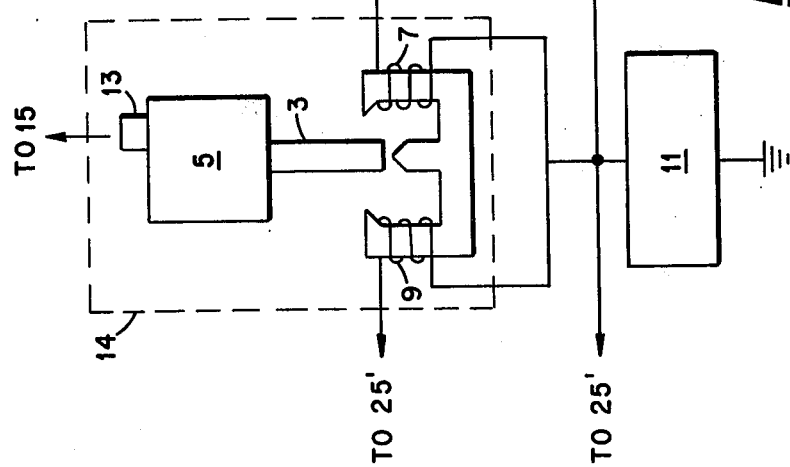

EDDY-CURRENT SYSTEM FOR THE VIBRATION-TESTING OF BLADES

This invention was made in the course of, or under, a contract with the United States Energy Research and Development Administration.

BACKGROUND OF THE INVENTION

This invention relates generally to methods and apparatus for electromagnetically vibrating articles which are subject to oscillating fatigue stresses in normal service. More particularly, it relates to improved methods and apparatus for inducing eddy currents in a non-ferrous cantilevered article so as to test the same in bending or torsional modes.

Previous techniques for the vibration-testing of cantilevered blades and the like have employed pneumatic, mechanical, and electromagnetic means for inducing vibration. For instance, vibration by pneumatic means is described in U.S. Pat. No. 3,005,334, for "Apparatus for Non-Destructive Inspection of Cantilevered Members," issued to E. R. Taylor, et al, Oct. 25, 1961. That method is, however, subject to the disadvantages of being noisy and failing to provide close control of blade vibration or temperature. A different vibration technique is disclosed in U.S. Pat. No. 3,023,610, for "A Method of and Apparatus for Carrying Out Fatigue Tests of Turbine Blades," issued to M. Prochazka, Mar. 6, 1962. In that approach, the blade is mounted to a cantilevered non-magnetic flexure arm. An armature carried by the flexure arm is vibrated by an a.c.-driven electromagnet mounted to a suitable base plate. In that method of vibration the energy is applied to the flexure arm rather than the blade itself, and thus the test conditions do not closely approach actual operating conditions in an axial-flow compressor. Also, that technique is suitable only for vibration-testing in the bending mode.

An electromagnetic system which more closely approaches actual operating conditions is disclosed in U.S. Pat. No. 3,600,934, for "Eddy-Current System for Vibration-Testing of Cantilevered Non-Ferrous Articles", issued to D. E. Hendrix and H. A. Kermicle on Aug. 24, 1971. In that system, an aluminum-alloy blade is cantilevered from a support block. The blade is vibrated in the bending mode or in the torsion mode by an electromagnet, and a permanent magnet is provided to spread the pulsating lines of force so as to increase the amount of blade vibration. A proximity probe generates an a.c. signal having the same frequency as the vibrated blade and having an amplitude proportional to the amplitude of blade vibration. The a.c. signal is shifted in phase, power-amplified, and fed to a half-wave rectifier. The resulting rectified voltage is the drive signal for the electromagnet. That system is subject to certain disadvantages, one being that the temperature of the blade under test increases appreciably. This may introduce errors in the measurement, since the fatigue properties of the blade are temperature-dependent. Heating of the blade occurs as a result of eddy currents flowing therein and of certain magnetic effects to be described hereinafter. Heating of the core of the electromagnet occurs for the same reasons, and this also is undesirable, since it may transfer heat to the blade under test.

SUMMARY OF THE INVENTION

Accordingly, it is an object of this invention to provide an improved method and apparatus for the vibration-testing of cantilevered non-ferrous articles.

It is another object to provide a novel method and system for vibration-testing cantilevered blades, rods, and the like.

It is another object to provide an improved method and system for vibration-testing an aluminum-alloy blade without appreciably increasing the temperature of the blade.

Other objects will be made evident hereinafter.

This invention can be summarized as follows: A system for vibration-testing a non-ferrous, electrically conductive cantilevered article by inducing eddy currents therein, said system comprising: a d.c. power supply; means including a high-mass mount for supporting an end of said article; an electromagnet for inducing eddy currents in said article to vibrate the same, said electromagnet including a winding; a vibration-sensing transducer for generating at an output an a.c. signal whose frequency is equal to the frequency of vibration of said article and whose amplitude is proportional to the amplitude of vibration of said article; a circuit coupling said winding to the output of said transducer, said circuit including a phase-shifting circuit coupled to the output of said transducer, a trigger-pulse generator coupled to said phase-shifting circuit for providing voltage pulses at an output thereof, and an electromagnet-exciting circuit connected to the output of said pulse generator for alternately and repetitively connecting said winding across said supply to establish an increasing current through said winding and disconnecting said winding from said supply and connecting said winding across a selected impedance to establish through said winding a self-induced decreasing current whose rate of decrease approximates the rate of increase of said increasing current, whereby pulsating d.c. current is established through said winding.

BRIEF DESCRIPTION OF THE DRAWINGS

FIG. 4 is a diagram showing current and voltage wave forms for two electromagnet windings 7 and 9, shown in FIG. 1. The wave forms are referenced to the centerline of a blade 3 (FIG. 1), FIG. 5 is a schematic diagram of a circuit for accomplishing the objectives of circuit 25, shown in block form in FIG. 1, FIG. 6 is a highly schematic diagram illustrating the operation of the circuit shown in FIG. 5, FIG. 9 is a diagram showing various waveforms for the electromagnet shown in FIG. 8

DESCRIPTION OF THE PREFERRED EMBODIMENT

This invention is generally applicable to the vibration-testing of cantilevered electrically-conductive articles by electromagnetically inducing eddy currents therein. For brevity, the invention will be illustrated as employed in the non-destructive or destructive testing of aluminum-alloy airfoils, or blades, designated for use in axial-flow compressors.

In experiments conducted with blade-vibrators of the eddy-current type, I have found that heating of the blade under test is reduced significantly if the varying electromagnetic field used to generate the eddy currents does not reverse polarity. As will be described, I have found that this mode of operation can be achieved in various ways.

Figure 1:
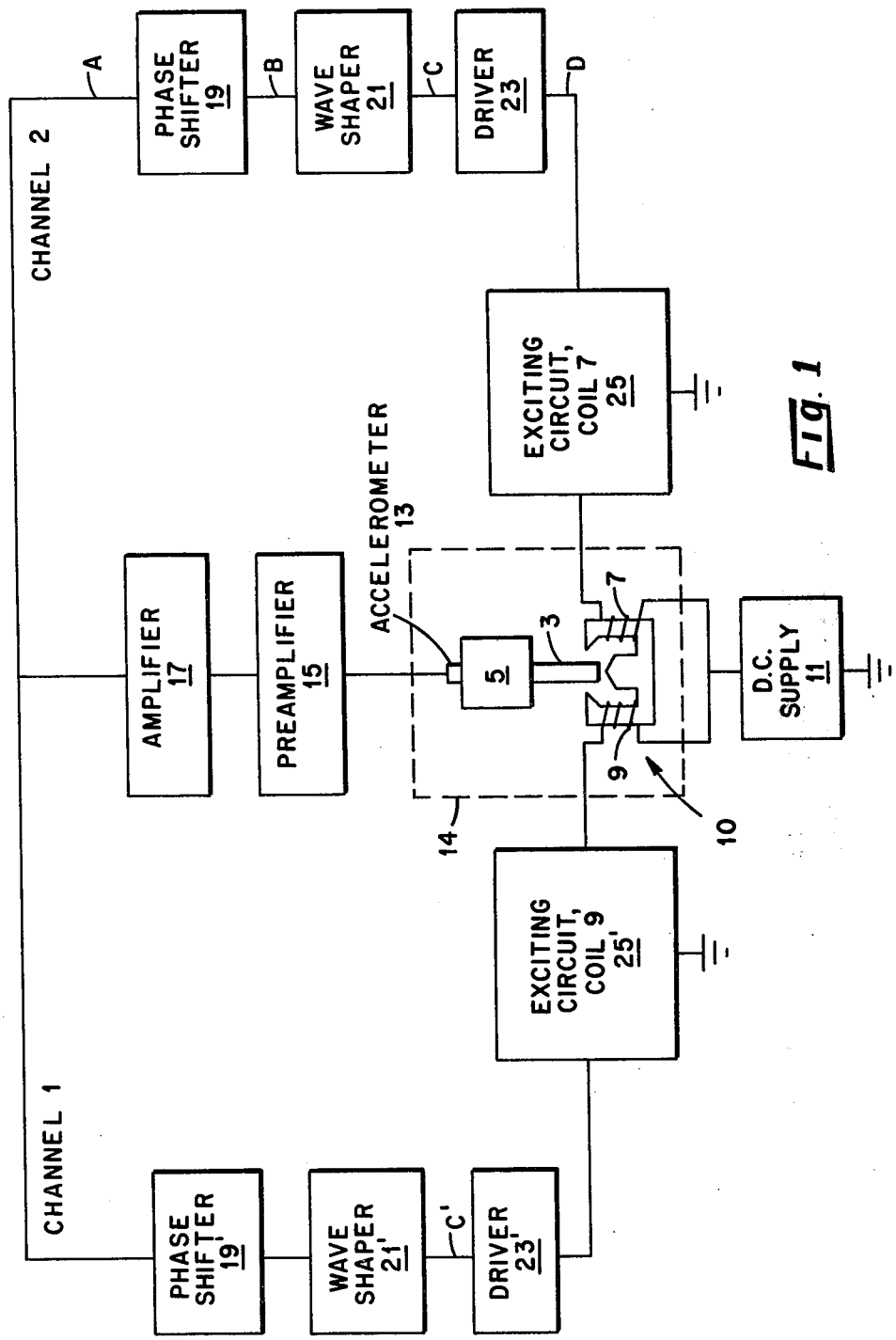
FIG. 1 is a schematic diagram of a system for vibration-testing aluminum alloy blades in accordance with this invention.

FIG. 1 is a schematic diagram of an embodiment of this invention comprising a solid-state electromagnetic blade tester designed for operation in a closed-loop, constant-power mode. Blade vibration is self-starting and smoothly adjustable over a relatively wide range of amplitudes. The tester is deigned to operate at bending- or torsional-mode frequencies.

As shown in FIG. 1, an aluminum-alloy blade 3 is cantilevered from any suitable holder 5, which is mounted to a high-mass support by means of springs (not shown), so as to vibrate with the blade. The blade is vibrated by a generally E-shaped electromagnet 10, whose outer legs are respectively provided with windings 7 and 9. The windings are connected in parallel through separate transistor switches to a grounded d.c. power supply 11. The free end of the blade is aligned with and extends close to the center leg of the electromagnet, as shown. Mounted to the block 5 is an accelerometer 13 or other suitable vibration transducer for generating an a.c. signal whose frequency is equal to the frequency of vibration of the blade and whose amplitude is proportional to the amplitude of vibration of the blade. In this particular illustration, the electromagnet 10 and the vibrated assembly are mounted within a housing 14 which is evacuated to similate the normal process environment for the blade. The signal from the accelerometer 13 (FIG. 1) is increased by amplifiers 15 and 17 and then impressed on similar parallel-connected channels 1 and 2. The channels respectively include phase-shifters 19 and 19'; trigger-pulse generators including wave shapers 21 and 21' and drivers 23 and 23'; and grounded circuits 25 and 25' for exciting the windings. As shown, the exciting circuits are respectively connected to the windings 7 and 9.

Figure 2:
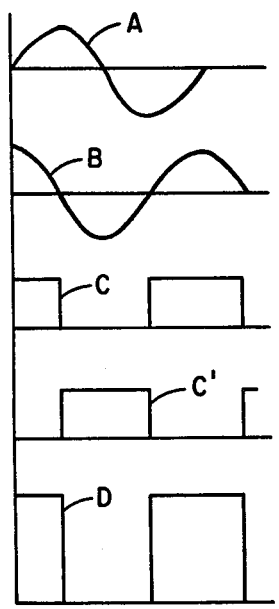
FIG. 2 is a diagram showing the voltage wave forms of various points in the system shown in FIG. 1.

The inputs to channels 1 and 2 are sinusoidal, in-phase voltages. The phase-shifters 19 and 19' are adjusted so that their output voltages differ in phase by 180°. In this particular example, the output voltage of shifter 19 leads its input voltage by 90°, whereas the output voltage of shifter 19' lags its input by 90°. The wave shapers 21 amd 21' convert their respective inputs to square waves, which are amplified and stablized in the driver circuits 23 and 23'. The square-wave outputs from the drivers are respectively fed to the exciting circuits 25 and 25', which serve as power switches for the coils 7 and 9. FIG. 2 illustrates the wave shapes of the voltages at points A, B, C, and D of channel 2, FIG. 1. The wave shape at point C' of channel 1 also is shown to illustrate that it is displaced 180° from the voltage C.

On reception of each voltage square wave D from driver 23, the exciting circuit 25 connects the electromagnet winding 7 in series with the d.c. supply 11 for the duration of that square wave. Thus, during that half-period the winding 7 is charged with an exponentially rising current. The square-wave voltage D terminates long before this current reaches the knee of the "charging curve", and thus the charging current is substantially linear. The exciting circuit 9 is operated in an analogous manner by its driver 25'. Because of the phase difference in the outputs of the drivers 23 and 23', winding 7 is charged during one half-period, whereas winding 9 is charged during the next half-period.

Figure 3:
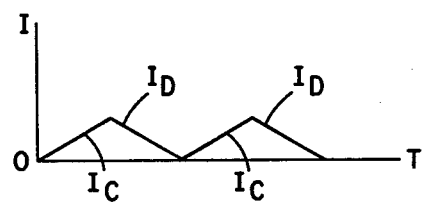
FIG. 3 is a diagram showing, in idealized form, the d.c. current flow through a typical electromagnet winding designated as 7 in FIG. 1.

In accordance with this invention, when the driver output D drops to zero, the exciting circuit 25 disconnects winding 7 from the supply 11 and immediately connects it across a discharge circuit, to be described. The discharge circuit is designed so that the decaying current generated in winding 7 by self-induction has a wave shape similar to that of the charging current for the winding. Thus, as shown in idealized form in FIG. 3, the current through winding 7 is pulsating d.c., each waveform of which consists of an increasing "charging" ramp $I_C$ and a decreasing "discharging" ramp $I_D$. The current through the other winding 9 of the electromagnet is controlled in analogous fashion by its exciting circuit 25'. That is, the current through winding 9 also is pulsating d.c. Because of the aforementioned phase difference in the inputs to the exciting circuits, the d.c. currents through the windings 7 and 9 differ in phase by 180°.

Figure 7:
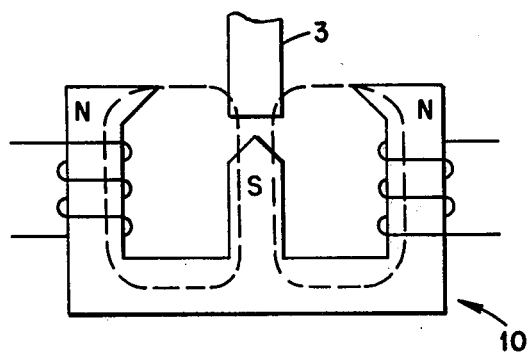
FIG. 7 is a schematic illustration of a typical magnetic field pattern for an electromagnet designated as 10 in FIG. 1.

Since the inputs to both windings of the electromagnet 10 are pulsating d.c., the magnetic fields effecting vibration of the blade 3 vary in magnitude but do not change polarity. (The fields may, for example, maintain the particular polarity shown in FIG. 7). Consequently, the amount of electrical power dissipated in the blade corresponds essentially to the eddy current resistive losses, and thus comparatively little heating of the blade occurs. Similarly, heating of the core of the electromagnet is reduced. The reasons for the reductions in heating are not well understood, but presumably less heat is generated because the use of unidirectional fields eliminates polarity reversals of the atomic and/or molecular moments in the blade and core.

FIG. 4 illustrates various waveforms for the windings 7 and 9. These are shown as related to a line 58 serving as a common reference for the waveforms as well as blade displacement. In this figure, the subscripts 7 and 9 represent the windings 7 and 9; $V_A$ and $V_I$ represent applied voltage and induced voltage, respectively; $I_C$ and $I_D$ represent charging current and discharging current, respectively; 60 represents the phase-shifted waveform; and 62 represents the waveform in phase with the output of the accelerometer 13, and the motion of the blade 3. While current is decaying in winding 7, current is rising in winding 9, and vice versa. The resultant magnetic field is represented by the diagonal line M of the parallelogram formed by the rising and decaying currents. Blade displacement follows M.

The individual components of the system shown in FIG. 1 may be of standard design and preferably are of the solid-state type. Referring to FIGS. 5 and 6, the typical exciting circuit—e.g., circuit 25—may comprise a pair of control transistors 27 and 29. These are connected in a Darlington configuration to provide a high-current base drive to a pair of parallel high-power transistors 31 and 22. These four transistors can be considered to be the equivalent of a single transistor, designated as $Q_D$ in FIG. 6. Transistor $Q_D$ is alternately turned full "on" and "off" by the driver 23. Conduction of $Q_D$ connects the winding 7 across the d.c. supply 11, with the result that an increasing charging current flows through the winding, building up a magnetic field. When $Q_D$ is turned "off" this field collapses and the resulting self-induced voltage across the winding, which is in series with the power supply voltage, charges the capacitor 39 to twice the value of the terminal voltage of supply 11 and turns diode 35 "on." When this diode conducts, twice the supply voltage exists at the collector of $Q_D$. FIG. 6 indicates the discharge paths for the current induced in the winding. The induced current discharges at a rate determined by resistors 37, $R_C$, and the parallel combination of R1 and R2. In this figure, $R_C$ represents the winding resistance; R1 represents the power supply resistance; and R2 represents the principal discharge path resistance. The discharge circuit is designed to have an impedance and time constant ensuring that the waveform of the discharge ramp $I_D$ approximates that of the charging ramp $I_C$ (see FIG. 3) in order to completely discharge the winding in one half-cycle of the waveform and to maintain symmetry of the resultant magnetic field. Thus, the rate of increase of the charging current and the rate of decrease of the discharging are approximately the same.

When $Q_D$ is fully "on", power dissipation is at a minimum, and when fully "off" it is zero. Thus, the transistor power disdipitation is optimum. Referring again to FIG. 5, the diodes 47 and 49 are provided to bypass inverse-polarity voltage transients appearing at the transistor bases. The diode 41 serves to bypass inverse-polarity voltage transients appearing at the collectors. The capacitor 39 is provided to ensure an induced square-wave voltage across winding 7 at discharge, for even the lowest frequency of blade vibration. A square-wave voltage is desired to ensure the desired wave form for the discharge current.

EXAMPLE

An eddy-current tester designed in accordance with FIGS. 1–6 was employed for the fatigue-testing of cast and forged aluminum-alloy compressor blades. The vibration-transducer 13 was Accelerometer Model No. INA10-1, manufactured by Columbia Research Laboratories, Woodlyn, Pa. The electromagnet 10 comprised a laminated iron core, and the windings 7 and 9 comprised copper tubing. Coolant was circulated through the tubing to remove power dissipated in the windings. In one series of tests, blades were vibrated to destruction with a ± ⅜ inch tip amplitude displacement. The heat rise in the typical blade was less than 10° F. In other tests, conducted at minimum-stress amplitudes, there was virtually no increase in the temperature of the blades under test. Much larger temperature rises were incurred in blade-vibration tests conducted with conventional eddy-current testers utilizing a.c. drive for the windings.

Figure 8:
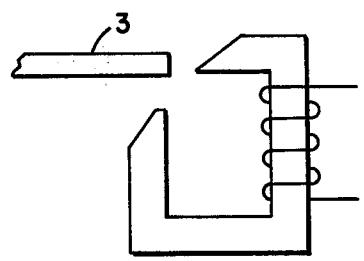
FIG. 8 is a schematic diagram of a single-winding electromagnet which can be used in a blade-vibration system designed in accordance with this invention.

Various modifications in the above-described embodiment of the invention will be apparent to those versed in the art. For example, as indicated in FIG. 8, the electromagnet 10 may consist of a single winding on a suitably shaped core. In this instance a single channel and exciting circuit would be employed. FIG. 9 illustrates typical waveforms for this embodiment of the invention. In FIG. 9, $V_A$ and $V_I$ represent applied voltage and induced voltage, respectively. The phase-shifted waveform is represented by 64, and the waveform in phase with the accelerometer output and blade motion is represented by 66. The charging and discharging currents are represented by $I_C$ and $I_D$, respectively. The coil current through the winding is in phase with the magnetic field.

It will be apparent to those versed in the art that, if desired, the switching portions of the exciting circuits 25 and 25' may be replaced by SCR circuits which are alternately turned on and off by conventional circuitry to accomplish the above-described objectives. The SCR's may be turned "on" by any suitable short-duration pulse.

What is claimed is:

1. A system for vibration-testing a non-ferrous, electrically conductive cantilevered article by inducing eddy currents therein, said system comprising:
   a d.c. power supply;
   means including a high-mass mount for supporting an end of said article;
   an electromagnet for inducing eddy currents in said article to vibrate the same, said electromagnet including a winding;
   a vibration-sensing transducer for generating at an output an a.c. signal whose frequency is equal to the frequency of vibration of said article and whose amplitude is proportional to the amplitude of vibration of said article;
   a circuit coupling said winding to the output of said transducer, said circuit including
   1. a phase-shifting circuit coupled to the output of said transducer;
   2. a trigger-pulse generator coupled to said phase-shifting circuit for providing voltage pulses at an output thereof; and
   3. an electromagnet-exciting circuit connected to the output of said pulse-generator for alternately and repetitively (a) connecting said winding across said supply to establish an increasing current through said winding and (b) disconnecting said winding from said supply and connecting said winding across a selected impedance to establish through said winding a self-induced decreasing current whose rate of decrease approximates the rate of increase of said increasing current, whereby pulsating d.c. current is established through said winding.

2. The system of claim 1 wherein the output of said transducer is coupled to said phase-shifting circuit through an amplifier.

3. The system of claim 1 wherein said trigger-pulse generator is a square-wave generator.

4. The system of claim 1 wherein said electromagnet-exciting circuit includes an electronic switch connected in series with said winding and said power supply.

5. The system of claim 4 wherein said exciting circuit includes a network which is coupled to the output of said generator for alternately turning said electronic switch "on" and "off" for substantially equal periods.

6. The system of claim 5 wherein said exciting circuit includes a discharge circuit for current which is generated in said winding by self-induction, said discharge circuit being in the conductive state when said electronic switch is "off".

7. A system for vibration-testing a non-ferrous, electrically conductive cantilevered article by inducing eddy currents therein, said system comprising:

a d.c. power supply;

means including a high-mass mount for holding an end of said article;

an electromagnet having first and second pole pieces spaced from the free end of said article and having first and second windings for inducing eddy currents in said article;

a vibration-sensing transducer for generating at an output an a.c. signal whose frequency is equal to the frequency of vibration of said article and whose amplitude is proportional to the amplitude of vibration of said article;

first and second channels respectively coupling said windings to the output of said transducer, each of said channels including 1. a variable phase-shifting circuit coupled to the output of said transducer;
2. a trigger-pulse generator coupled to said phase-shifting circuit for providing voltage pulses at an output thereof;
3. an exciting circuit connected to the output of said generator for alternately and repetitively (a) connecting its respective winding across said supply to establish an increasing current through said winding and (b) disconnecting said winding from said supply and connecting said winding across a selected impedance to establish through said winding a self-induced decreasing current whose rate of decrease approximates the rate of increase of said increasing current, whereby a pulsating d.c. exciting current is established through said winding.

8. The system of claim 1 wherein said transducer is coupled to said first and second channels through an amplifier.

9. The system of claim 1 wherein the exciting circuits in said first and second channels each include an electronic switch connected in series with its respective winding and said power supply.

10. The system of claim 9 wherein the exciting circuits in said first and second channels each include a network which is coupled to the output of its respective generator to turn its respective electronic switch "on" for a selected period.

* * * * *